United States Patent
Siraux et al.

(10) Patent No.: US 8,946,359 B2
(45) Date of Patent: Feb. 3, 2015

(54) PROCESS FOR PREPARING POLYOLEFINS

(75) Inventors: Daniel Siraux, Naast (BE); Aurélien Vantomme, Bois-de-Villers (BE); Eric Damme, Arquennes (BE); Daan Dewachter, Mechelen (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 46 days.

(21) Appl. No.: 13/812,693

(22) PCT Filed: Jul. 29, 2011

(86) PCT No.: PCT/EP2011/063132
§ 371 (c)(1),
(2), (4) Date: Jan. 28, 2013

(87) PCT Pub. No.: WO2012/013794
PCT Pub. Date: Feb. 2, 2012

(65) Prior Publication Data
US 2013/0123441 A1    May 16, 2013

(30) Foreign Application Priority Data
Jul. 30, 2010  (EP) .................................... 10171372

(51) Int. Cl.
*C08F 2/00* (2006.01)
*C08F 2/01* (2006.01)
*B01J 4/00* (2006.01)
*B01J 8/00* (2006.01)
*B01J 19/18* (2006.01)
*C08F 210/16* (2006.01)

(52) U.S. Cl.
CPC .................. *C08F 2/01* (2013.01); *B01J 4/001* (2013.01); *B01J 8/007* (2013.01); *B01J 19/1818* (2013.01); *B01J 19/1837* (2013.01); *C08F 210/16* (2013.01)
USPC ............................................... 526/64; 526/74

(58) Field of Classification Search
CPC ........ B01J 4/001; B01J 8/007; B01J 19/1818; B01J 19/1837; C08F 210/16; C08F 2/01; C08F 2/005; C08F 2/14; C08F 210/14
USPC ..................................................... 526/64, 74
See application file for complete search history.

(56) References Cited

U.S. PATENT DOCUMENTS

| | | |
|---|---|---|
| 2005/0165181 A1 | 7/2005 | Tharappel et al. |
| 2007/0049709 A1 | 3/2007 | Miserque et al. |
| 2008/0114135 A1 | 5/2008 | Tharappel et al. |

FOREIGN PATENT DOCUMENTS

WO            9921898 A1    5/1999

OTHER PUBLICATIONS

Lawrence Pumps Inc. "Axial Flow Circulator Pumps for Polyolefin Reactors", Series 9500 pp. 1-6, copyrighted 1993.*
"Axial Flow Circulator Pumps for Polyolefin Reactors", Internet Citation, No. Series 9500 pp. 1-6, XP00261397, http://www.lawrencepumps.com/documents.9500%20loop%reactor.pdf [retrieved on Dec. 13, 2010], (1993).

* cited by examiner

*Primary Examiner* — William Cheung

(57) ABSTRACT

The present invention relates to a process of preparing a polyolefin in a loop reactor by introducing anti-fouling agent through a sleeve provided around at least part of the shaft of the pump. Also, the invention relates to the use of anti-fouling agent to prevent or reduce fouling by feeding the anti-fouling agent against the impeller of the pump upon introduction to the loop reactor.

18 Claims, 3 Drawing Sheets

PROCESS FOR PREPARING POLYOLEFINS

CROSS-REFERENCE TO RELATED APPLICATIONS

This application claims the benefit of PCT/EP2011/063132, filed Jul. 29, 2011, which claims priority from EP 10171372.5, filed Jul. 30, 2010.

TECHNICAL FIELD OF THE INVENTION

The present invention relates to processes for the preparation of polyolefins and the use of anti-fouling agents therein.

BACKGROUND OF THE INVENTION

Polyolefins, such as polyethylene (PE), are synthesized by polymerizing monomers, such as ethylene ($CH_2$=$CH_2$). Because it is cheap, safe, stable to most environments and easy to be processed polyolefins are useful in many applications. Polyethylene can be classified into several types, such as but not limited to LDPE (Low Density Polyethylene), LLDPE (Linear Low Density Polyethylene), and HDPE (High Density Polyethylene) as well as High Molecular Weight (HMW), Medium Molecular Weight (MMW) and Low Molecular Weight (LMW). Each type of polyethylene has different properties and characteristics.

Olefin (such as ethylene) polymerizations are frequently carried out in a loop reactor using monomer (such as ethylene), diluent and catalyst, optionally an activating agent, optionally one or more co-monomer(s), and optionally hydrogen.

Polymerization in a loop reactor is usually performed under slurry conditions, with the produced polymer usually in a form of solid particles suspended in diluent. The slurry is circulated continuously in the reactor with a pump to maintain efficient suspension of the polymer solid particles in the liquid diluent. Polymer slurry is discharged from the loop reactor by means of settling legs, which operate on a batch principle to recover the slurry. Settling in the legs is used to increase the solid concentration of the slurry finally recovered as product slurry. The product slurry is further discharged through heated flash lines to a flash tank, where most of the diluent and unreacted monomers are flashed off and recycled.

Optionally, the product slurry may be fed to a second loop reactor serially connected to the first loop reactor wherein a second polymer fraction may be produced. Typically, when two reactors in series are employed in this manner, the resultant polymer product is a bimodal polymer product, which comprises a first polymer fraction produced in the first reactor and a second polymer fraction produced in the second reactor, and has a bimodal molecular weight distribution.

After the polymer product is collected from the reactor and the hydrocarbon residues are removed, the polymer product is dried, additives can be added and finally the polymer may be mixed and pelletized.

During the mixing step, polymer product and optional additives are mixed intimately in order to obtain a compound as homogeneous as possible. Preferably, mixing is done in an extruder wherein the ingredients are mixed together and the polymer product and optionally some of the additives are melted so that intimate mixing can occur. The melt is then extruded into a rod, cooled and granulated, e.g. to form pellets. In this form the resulting compound can then be used for the manufacturing of different objects.

It has been found on an industrial scale that while the polymer particles are insoluble or substantially insoluble in the diluent, the polymer product has some tendency to deposit on the walls of the polymerization reactor. This so-called "fouling" can lead to a decrease in the efficiency of heat exchange between the reactor bulk and the coolant around the reactor. This leads in some cases to loss of reactor control due to overheating, or to reactor or down stream polymer processing equipment failure due to formation of agglomerates (ropes, chunks).

This "fouling" is caused in part by fines and also by the build up of electrostatic charge on the walls on the reactor. Attempts to avoid fouling during slurry polymerization have been made by adding an antifouling agent in the polymerization medium. Typically, the antifouling agent acts for example to make the medium more conductive, thus preventing to some extent the formation of electrostatic charge, which is one cause of the build-up of polymer on the wall of the reactor.

However, complications may still occur during polyolefin production such as partial or even complete blockage of the loop reactor. These problems can be even more pronounced with particular polyolefins, such as polyethylenes. Blockage may require stopping the production process to unclog and clean the reactor; only then, production can be resumed.

There remains a need in the art for an improved polyolefin production process, particularly for polyethylene and more particularly for high molecular weight polyethylene of high density, and especially to reduce production costs, control process conditions and/or produce optimal polymer end-products.

SUMMARY OF THE INVENTION

Surprisingly, the present inventors have found a way to improve polyolefin preparation processes and overcome at least one of the above and other problems of the prior art. Accordingly, the present invention relates to a process of preparing a polyolefin in a loop reactor in the presence of anti-fouling agent, said loop reactor comprising interconnected pipes, defining a reactor path, and an axial pump comprising a motor, a shaft and an impeller, characterized in that at least part of the anti-fouling agent is introduced into said loop reactor through a sleeve provided around at least part of the shaft of said pump.

In another aspect, the present invention relates to the use of anti-fouling agent to prevent or reduce fouling of a loop reactor comprising a pump with a shaft and an impeller by introducing the anti-fouling agent into the loop reactor against the side of the impeller which is connected to the shaft of said pump.

In another aspect, the present invention relates to the use of anti-fouling agent to prevent or reduce fouling of a loop reactor comprising a pump with a shaft and an impeller by introducing the anti-fouling agent into the loop reactor against through a sleeve provided around at least part of the shaft of the pump.

In particular, the inventors have found that such use of the anti-fouling agent prevents fouling and in particular blockage of the pump of the loop reactor.

Surprisingly, the present inventors have found that the invention leads to fewer blockage, lower production costs, better controlled process conditions and/or more optimal polymer end-products. In particular, the present inventors have found that introduction of the anti-fouling agent according to the invention (in the manner, i.e. the way and/or the location) leads to fewer reactor blockages and other benefits. In particular, when introducing the antifouling agent via the pump, no polymer accumulation was found behind the impeller and along the shaft of the pump. In addition, the presence of the antifouling agent in the pump prevented an increase of pump vibrations and maintained stable pump power.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous. The description is only given by way of example and does not limit the invention. The reference numbers relate to the hereto-annexed figures.

DETAILED DESCRIPTION OF INVENTION

Figure 1:
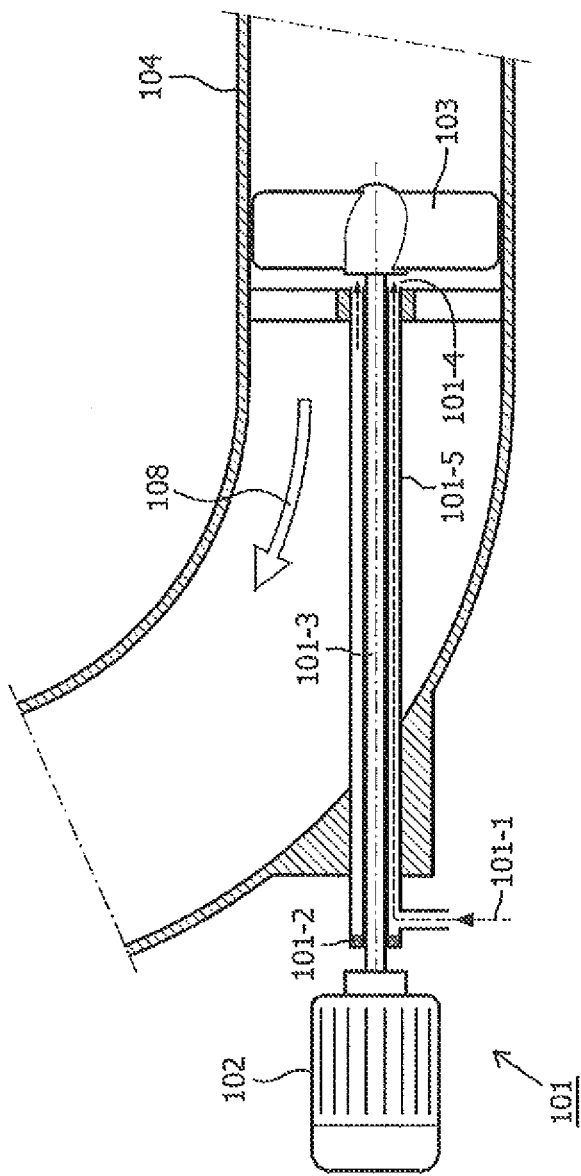
FIG. 1 schematically illustrates the details of a pump that can be used in the process according to an embodiment of the present invention.

The process is particularly useful in an alpha-olefin polymerization reactor wherein the polymerization is performed under high pressure, and more especially into slurry reactor. The case of ethylene is exemplified, but in a non limitative manner.

According to the polymerization process of the present invention, a slurry is prepared by feeding reactants to a loop reactor, circulating the slurry through the loop reactor by means of a pump, and polymerizing said monomer to produce polyolefin (preferably polyethylene) slurry comprising diluent and solid polyolefin (preferably polyethylene) particles. Said reactants preferably include diluent, monomers, one or more anti-fouling agent, catalyst, optionally co-monomers, optionally hydrogen, and optionally activating agent. According to the present invention, the one or more antifouling agent is introduced in the loop reactor through a sleeve provided around at least part of the shaft of the pump.

As used in the present invention, the term "anti-fouling agent" refers to material that prevents fouling of the inside of the reactor wall.

Preferably, the anti-fouling agent is fed against the impeller of the pump. Preferably, the anti-fouling agent is fed against the side of the impeller which is connected (attached) to the shaft of said pump.

According to an embodiment of the invention, at least part of the total amount of anti-fouling agent fed to the loop reactor is introduced through the sleeve around the shaft of the pump, preferably at least 10%, more preferably at least 25%, most preferably at least 50% by weight and particularly preferred is that all anti-fouling agent is fed through the sleeve into the reactor.

Preferably, the anti-fouling agent is fed under flushing with diluent, more preferably under flushing with diluent at a level of more than 100 kg/h, most preferably at a level of more than 300 kg/h, more preferably around 750 kg/h.

Preferably, the diluent comprises less than 15% by weight of monomer, preferably less than 10% by weight, more preferably less than 5% by weight, most preferably less than 1% by weight of monomer.

In an embodiment, the anti-fouling agent comprises cationic agents, anionic agents, nonionic agents, organometallic agents, polymeric agents or mixtures thereof.

Suitable examples of cationic agents can be selected from quaternary ammonium, sulfonium or phosphonium salts with long (preferably $C_{5-20}$) hydrocarbon chain, for examples chloride, sulfate, nitrate, or hydrogen phosphate salts thereof.

Examples of suitable anionic agents can be selected from sulfated oils, sulfated amide oils, sulfated ester oils, fatty alcohol sulfuric ester salts, alkyl sulfuric ester salts, fatty acid ethyl sulfonic acid salts, alkyl sulfonic acid salts (for example sodium alkyl sulfonates), alkylnaphthalene-sulfonic acid salts, alkylbenzene-sulfonic acid salts, phosphoric esters (for example alkyl phosphonates), alkyl phosphates, alkyl dithiocarbamate or mixtures thereof.

Examples of suitable nonionic agents can be selected from partial fatty acid esters of polyhydric alcohols; alkoxylated fatty alcohols such as ethoxylated or propoxylated fatty alcohols; polyethylene glycol (PEG) esters of fatty acids and alkylphenols; glyceryl esters of fatty acids and sorbitol esters; ethylene oxide adducts of fatty amines or fatty acid amides; ethylene oxide adducts of alkylphenols; ethylene oxide adducts of alkylnaphthols; polyethylene glycol, and fatty acid esters of alkyldiethanolamines, or mixtures thereof.

Examples of suitable organometallic agents can be selected from neoalkyl titanates and zirconates, or mixtures thereof.

Examples of suitable polymeric agents can be selected from polyoxyalkylenic compounds such as polyethylene glycol hexadecyl ether; ethylene oxide/propylene oxide copolymers; or mixtures thereof. For example, suitable ethylene oxide/propylene oxide copolymer antifouling agent can comprise one or more $—(CH_2—CH_2—O)_k—$ where each k is in the range from 1 to 50; and one or more $—(CH_2—CH(R)—O)_n—$ wherein R comprises an alkyl group having from 1 to 6 carbon atoms and each n is in the range from 1 to 50, and terminated by a R' and a R" end groups, wherein R' is OH or an alkoxy having from 1 to 6 carbon atoms and R" is H or an alkyl having from 1 to 6 carbon atoms. In an embodiment, the anti-fouling agent is a block polymer, more preferably a tri-block polymer. In an embodiment, the antifouling agent is a block polymer of general formula:

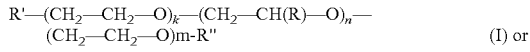

(I) or

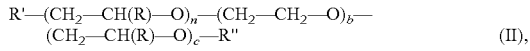

(II), wherein R comprises an alkyl group; R' and R" are end groups; k is from 1 to 50; n is from 1 to 50; m is greater than or equal to 1; a is from 1 to 50; b is from 1 to 50; and c is from 0 to 50; k and m and a and c may be the same or different. Preferably R is a C1 to C3 alkyl group. More preferably, R is a methyl group. Preferably, in one embodiment, k is greater than 1 and m is greater than 1. Also preferably, in another embodiment a is 0 or c is 0.

Preferred R' and R" groups include H; OH; alkyl, and alkoxy groups. Preferred alkyl groups are C1 to C3 alkyl groups. Preferred alkoxy groups are C1 to C3 alkoxy groups. In formulae (I) and (II) above, it is preferred that R' is OH or an alkoxy group, preferably OH or a C1 to C3 alkoxy group. Further, it is preferred that R" is H or an alkyl group, preferably H or a C1 to C3 alkyl group. A particularly preferred polymer has general formula (III): R'—$(CH_2—CH_2—O)_k$—$(CH_2—CH(CH_3)—O)_n$—$(CH_2—CH_2—O)_m$—R" (III), wherein R', R", k, n, and m independently are as defined anywhere above. A further preferred polymer has general formula (IV): OH—(CH$_2$—CH$_2$—O)$_k$—(CH$_2$—CH(R)—O)$_n$—(CH$_2$—CH$_2$—O)$_m$—H (IV), wherein R, k, n, and m independently are as defined anywhere above. It will be appreciated that, by virtue of the preferred molecular weights for the anti-fouling agent and the preferred ethylene oxide contents in the present anti-fouling agent given above, preferred values for a, b, c, k, n, and m can be derived. Preferably, the weight percentage of ethylene oxide in the anti-fouling agent is in the range of from 5 to 40%, more preferably from 8 to 30%, even more preferably from 10 to 20%, most preferably about 10%. In an embodiment, the ethylene oxide/propylene oxide copolymer has a molecular weight (MW) greater than 1000 Daltons, preferably greater than 2000 Daltons, more preferably in the range from 2000-4500 Daltons.

Examples of suitable commercially available antifouling agents include those under the trade designation Armostat® (such as Armostate 300 (N,N-bis-(2-hydroxyethyl)-(C.sub.10-C.sub.20)alkylamine), Armostate 410 (bis(2-hydroxyethyl)cocoamine), and Armostat® 600 (N,N-bis(2-hydroxy-ethyl)alkylamine) from Akzo Nobel Corporation; those under the trade designation Chemax X997® (>50% of dicocoalkyl-dimethyl ammonium chloride, about 35% 1-hexene, <2% isopropanol, and <1% hexane); those under the trade designation Atmer 163 (N,N-Bis(2hydroxy-ethyl) alkylamine) from ICI Americas; those under the trade designation Statsafe 6000 (dodecylbenzenesulfonic acid) from Innospec Limited; those under the trade designation Octastat® 3000 (about 40-50% toluene, about 0-5% propan-2-ol, about 5-15% DINNSA (dinonyinaphthasulphonic acid), about 15-30% solvent naptha, about 1-10% trade secret polymer containing N, and about 10-20% trade secret polymer containing 5) from Octel Performance Chemicals; those under the trade designation Kerostate 8190 (about 10-20% alkenes (polymer with sulfur dioxide), about 3-8% benzenesulfonic acid (4-C10-13-sec-alkyl derivatives) and organic solvent from BASF, those under the trade designation Stadis® 450 (about 14 wt % of polybutene sulfate, about 3 wt % of aminoethanolepichlorohydrin polymer, about 13 wt % of alkylbenzenesulfonic acid, about 70 wt % of toluene and trace amounts of quaternary ammonium salt of aliphatic alkyl and propyl alcohol) from E. I. Du Pont de Nemours & Co.; Synperonic PEL121 (ethyleneoxide-propyleneoxide-ethyleneoxide block copolymer, about 10% of propyleneoxide, MW about 4400 Da) from Uniqema and the like.

Preferred examples of anti-fouling agents for use in the invention are Stadis 450, Statsafe 6000 and Synperonic PEL121. Stadis 450 and Statsafe 6000 are preferably used for Ziegler-Natta catalysts. Synperonic PEL121 is particularly preferred for use with metallocene catalysts.

Preferably, anti-fouling agent is fed to the reactor as a composition with a solvent, preferably dissolved in a solvent. Preferably, the solvent is selected from C4-C10 aliphatic and olefin compounds. Preferably, the solvent is selected from unsaturated (olefin) C4-C10 compounds. In an embodiment, said solvent is selected from hexane, hexene, cyclohexane, or heptane. Most preferably, the solvent is hexene.

Preferably, the anti-fouling composition comprises at least 0.1%, more preferably at least 0.5%, most preferably at least 1% and preferably at most 50%, more preferably at most 30% and most preferably at most 10% by weight of anti-fouling agent.

Preferably, anti-fouling agent is used in the loop reactor at a level of from 0.1 to 50 ppm in the polymer slurry, preferably from 1 to 20 ppm, preferably from 1 to 10 ppm, yet more preferably from 1 to 5 ppm, yet more preferably from 1 to 3 ppm.

In an embodiment, the present invention relates to a process of preparing polyolefin in a loop reactor, said loop reactor comprising interconnected pipes, defining a reactor path, and an axial pump comprising a motor, a shaft and an impeller, wherein at least one anti-fouling agent is introduced into said loop reactor through a line (sleeve) along the shaft of said pump.

In an embodiment, said polyolefin is produced in slurry conditions.

Said process comprises the step of preparing a slurry by feeding into said loop reactor diluent; monomers; catalyst; anti-fouling agent; optionally hydrogen; optionally one or more co-monomers; and optionally activating agent; and circulating said slurry through said loop reactor by means of the pump. According to the invention, at least part of the antifouling agent is introduced into the reactor through a sleeve provided around at least part of the shaft of the pump.

As used herein, the term "monomer" refers to olefin compound that is to be polymerized. Examples of olefin monomers are ethylene and propylene. Preferably, the invention is directed to ethylene.

In a preferred embodiment, the present invention relates to a process of preparing polyethylene in a loop reactor, said loop reactor comprising interconnected pipes, defining a reactor path, and an axial pump comprising a motor, a shaft and an impeller, wherein anti-fouling agent is introduced into said loop reactor through a sleeve provided around at least part of the shaft of said pump.

In an embodiment, said polyolefin is polyethylene. The present invention is particularly suitable for polymerization process for preparing polyethylene, and preferably for preparing monomodal or bimodal polyethylene. Ethylene polymerizes in a liquid diluent in the presence of a catalyst, optionally an activating agent, optionally a co-monomer, optionally hydrogen and optionally other additives, thereby producing polymerization slurry.

As used herein, the term "polymerization slurry" or "polymer slurry" or "slurry" means substantially a multi-phase composition including at least polymer solids and a liquid phase, the liquid phase being the continuous phase. The solids include catalyst and a polymerized olefin, such as polyethylene. The liquids include an inert diluent, such as isobutane, dissolved monomer such as ethylene, co-monomer, molecular weight control agents, such as hydrogen, antistatic agents, antifouling agents, scavengers, and other process additives.

As used herein, the term "diluent" refers to diluents in liquid form that is in a liquid state, liquid at room temperature and preferably liquid under the pressure conditions in the loop reactor. Diluents which are suitable for being used in accordance with the present may comprise but are not limited to hydrocarbon diluents such as aliphatic, cycloaliphatic and aromatic hydrocarbon solvents, or halogenated versions of such solvents. The preferred solvents are C12 or lower, straight chain or branched chain, saturated hydrocarbons, C5 to C9 saturated alicyclic or aromatic hydrocarbons or C2 to C6 halogenated hydrocarbons. Non-limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane. However, it should be clear from the present invention that other diluents may as well be applied according to the present invention.

Suitable ethylene polymerization includes but is not limited to homopolymerization of ethylene, copolymerization of ethylene and a higher 1-olefin co-monomer.

As used herein, the term "co-monomer" refers to olefin co-monomers which are suitable for being polymerized with ethylene monomers. Co-monomers may comprise but are not limited to aliphatic C3-C20 alpha-olefins. Examples of suitable aliphatic C3-C20 alpha-olefins include propylene, 1-butene, 1-pentene, 4-methyl-1-pentene, 1-hexene, 1-octene, 1-decene, 1-dodecene, 1-tetradecene, 1-hexadecene, 1-octadecene and 1-eicosene. The term "co-polymer" refers to a polymer, which is made by linking two different types of in the same polymer chain. The term "homo-polymer" refers to a polymer which is made by linking ethylene monomers, in the absence of co-monomers. In an embodiment of the present invention, said co-monomer is 1-hexene.

In a preferred embodiment, reactants comprising the monomer ethylene, isobutane as hydrocarbon diluent, a catalyst, at least one antifouling agent, the co-monomer 1-hexene are used.

As used herein, the term "catalyst" refers to a substance that causes a change in the rate of a polymerization reaction without itself being consumed in the reaction. In the present invention it is especially applicable to catalysts suitable for the polymerization of ethylene to polyethylene. These catalysts will be referred to as ethylene polymerization catalysts or polymerization catalysts. In the present invention it is especially applicable to ethylene polymerization catalysts such as metallocene catalysts and/or Ziegler-Matta catalysts.

In an embodiment of the present invention, said catalyst is a metallocene catalyst. The term "metallocene catalyst" is used herein to describe any transition metal complexes consisting of metal atoms bonded to one or more ligands. The metallocene catalysts are compounds of Group IV transition metals of the Periodic Table such as titanium, zirconium, hafnium, etc., and have a coordinated structure with a metal compound and ligands composed of one or two groups of cyclo-pentadienyl, indenyl, fluorenyl or their derivatives. Use of metallocene catalysts in the polymerization of polyethylene has various advantages. The key to metallocenes is the structure of the complex. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

In an embodiment, the metallocene catalyst has a general formula (I) or (II):

(Ar)$_2$MQ$_2$   (I); or

R$^1$(Ar)$_2$MQ$_2$   (II)

wherein the metallocenes according to formula (I) are non-bridged metallocenes and the metallocenes according to formula (II) are bridged metallocenes;

wherein said metallocene according to formula (I) or (II) has two Ar bound to M which can be the same or different from each other;

wherein Ar is an aromatic ring, group or moiety and wherein each Ar is independently selected from the group consisting of cyclopentadienyl, indenyl, tetrahydroindenyl or fluorenyl, wherein each of said groups may be optionally substituted with one or more substituents each independently selected from the group consisting of halogen, a hydrosilyl, a SiR$^2_3$ group wherein R$^2$ is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P;

wherein M is a transition metal M selected from the group consisting of titanium, zirconium, hafnium and vanadium; and preferably is zirconium;

wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F, Cl and P; and wherein R$^1$ is a divalent group or moiety bridging the two Ar groups and selected from the group consisting of a C$_1$-C$_{20}$ alkylene, a germanium, a silicon, a siloxane, an alkylphosphine and an amine, and wherein said R$^1$ is optionally substituted with one or more substituents each independently selected from the group consisting of halogen, a hydrosilyl, a SiR$^3_3$ group wherein R$^3$ is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P.

The term "hydrocarbyl having 1 to 20 carbon atoms" as used herein is intended to refer to a moiety selected from the group comprising a linear or branched C$_1$-C$_{20}$ alkyl; C$_3$-C$_{20}$ cycloalkyl; C$_6$-C$_{20}$ aryl; C$_7$-C$_{20}$ alkylaryl and C$_7$-C$_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl. Exemplary halogen atoms include chlorine, bromine, fluorine and iodine and of these halogen atoms, fluorine and chlorine are preferred.

Illustrative examples of metallocene catalysts comprise but are not limited to bis(cyclopentadienyl)zirconium dichloride (Cp$_2$ZrCl$_2$), bis(cyclopentadienyl) titanium dichloride (Cp$_2$TiCl$_2$), bis(cyclopentadienyl) hafnium dichloride (Cp$_2$HfCl$_2$); bis(tetrahydroindenyl)zirconium dichloride, bis (indenyl)zirconium dichloride, and bis(n-butyl-cyclopentadienyl)zirconium dichloride; ethylenebis(4,5,6,7-tetrahydro-1-indenyl) zirconium dichloride, ethylenebis(1-indenyl) zirconium dichloride, dimethylsilylene bis(2-methyl-4-phenyl-inden-1-yl)zirconium dichloride, diphenylmethylene (cyclopentadienyl)(fluoren-9-yl)zirconium dichloride, and dimethylmethylene [1-(4-tert-butyl-2-methyl-cyclopentadienyl)](fluoren-9-yl)zirconium dichloride.

The metallocene catalysts are preferably provided on a solid support. The support can be an inert solid, organic or inorganic, which is chemically unreactive with any of the components of the conventional metallocene catalyst. Suitable support materials for the supported catalyst of the present invention include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-aluminas. Most preferred is silica. The silica may be in granular, agglomerated, fumed or other form. The support is preferably a silica compound. In a preferred embodiment, the metallocene catalyst is provided on a solid support, preferably a silica support. In an embodiment, the catalyst for use in the present process is a supported metallocene-alumoxane catalyst consisting of a metallocene and an alumoxane which are bound on a porous silica support.

In another embodiment of the present invention, said catalyst is a Ziegler-Natta catalyst. The term "Ziegler-Natta catalyst" or "ZN catalyst" refers to catalysts having a general formula $M^1X_v$, wherein $M^1$ is a transition metal compound selected from group IV to VII, wherein X is a halogen, and wherein v is the valence of the metal. Preferably, $M^1$ is a group IV, group V or group VI metal, more preferably titanium, chromium or vanadium and most preferably titanium. Preferably, X is chlorine or bromine, and most preferably, chlorine. Illustrative examples of the transition metal compounds comprise but are not limited to $TiCl_3$, $TiCl_4$. Suitable ZN catalysts for use in the invention are described in U.S. Pat. No. 6,930,071 and U.S. Pat. No. 6,864,207, which are incorporated herein by reference.

In an embodiment, the catalyst is added to the reactor as a catalyst slurry. As used herein, the term "catalyst slurry" refers to a composition comprising catalyst solid particles and a diluent. The solid particles can be suspended in the diluent, either spontaneously or by homogenization techniques, such as mixing. The solid particles can be non-homogeneously distributed in a diluent and form a sediment or deposit.

Optionally, activating agent is used in processes according to the invention. The term "activating agent" refers to materials that can be used in conjunction with a catalyst in order to improve the activity of the catalyst during the polymerization reaction. In the present invention, it particularly refers to an organo-aluminium compound, being optionally halogenated, having general formula $AlR^{11}R^{12}R^{13}$ or $AlR^{11}R^{12}Y$, wherein $R^{11}$, $R^{12}$, $R^{13}$ is an alkyl having from 1 to 6 carbon atoms and $R^{11}$, $R^{12}$, $R^{13}$ may be the same or different and wherein Y is hydrogen or a halogen, as disclosed in U.S. Pat. No. 6,930,071 and U.S. Pat. No. 6,864,207, which are incorporated herein by reference. Preferred activating agents are Tri-Ethyl Aluminum (TEA), Tri-Iso-Butyl Aluminum (TIBAl), Tri-Methyl Aluminum (TMA), and Methyl-Methyl-Ethyl Aluminum (MMEAl). TEAl is particularly preferred. In an embodiment, the activating agent is added to the loop reactor in an activating agent slurry at a concentration of less than 90% by weight of the activating agent slurry composition, more preferably from 10 to 50% by weight, for instance around 20% by weight. Preferably, the concentration of the activating agent in the loop reactor is lower than 200 ppm, more preferably from 10 to 100 parts per million, most preferably from 20-70 ppm and for instance around 50 ppm.

The polymerization can be performed over a wide temperature range. Preferably, the temperature is within the range of about 0° C. to about 110° C. A more preferred range is from about 60° C. to about 100° C., more preferably from about 80 to 110° C., The reactor pressure is preferably held between 20 and 100 bar, 30 to 50 bar, more preferably at pressure of 37 to 45 bar. In an embodiment, the slurry flow can be set between 5 and 15 m/s.

The loop reactor of the present invention comprises interconnected pipes, defining a reactor path. The reactor is loaded with reactants used in the polymerization reaction of the invention, as described below.

Preferably, the loop reactor used in the present invention contains a pump, more preferably an axial pump. Axial pumps allow fluid to enter the impeller axially. They discharge fluid—nearly—axially, pumping (circulating) the liquid in a direction that is parallel to the rotor shaft. Preferably, the pump comprises an impeller, a shaft (or rotor shaft) and a motor.

Preferably, the impeller of the pump contains at least 4 blades, more preferably at least 5 blades, most preferably 6 blades. The term "blade" refers to a vane or airfoil of the impeller, radially connected to the shaft. The blades collectively form the impeller, which moves fluid by rotating. The blades can be fixed directly on the shaft or they can alternatively be fixed on a hub, that can be positioned around the shaft.

Preferably, the shaft of the pump rotates and extends outwards through the wall of the pipe (or tube) of the loop reactor, preferably in an L-shaped bend of the reactor path, where it is connected to the motor.

Preferably, the motor of the pump directly or indirectly (e.g. via magnetic coupling) drives the rotor shaft. Preferably, the motor is an electromotor.

Preferably, the impeller is connected to the shaft which extends through the reactor wall and is connected to the external motor. Preferably, the blades and/or hub, and/or shaft are made from inox (alternatively referred to as stainless steel or corrosion-resistant steel).

Preferably, the pump is positioned in a bend of the loop reactor. Preferably, the impeller is located in or upstream of the bend in the loop reactor.

Preferably, at least part of the shaft of the pump is provided with a sleeve. Preferably, according to the invention, at least part of the anti-fouling agent is introduced into said loop reactor through a sleeve provided around at least part of the shaft of said pump. Preferably, the space between the sleeve and the shaft provide a line for feeding anti-fouling agent to the reactor. Preferably, the antifouling agent is fed to the impeller. Preferably, the sleeve and the shaft provide an outlet for the anti-fouling agent located in the vicinity of the impeller and, more preferably, on the side of the impeller attached to the shaft of said pump. The opposite end of the sleeve is preferably sealed. In a preferred embodiment, the vicinity of the impeller can be defined in the same pipe segment of the loop reactor. Preferably, anti-fouling agent is introduced to the loop reactor against the impeller, more preferably downstream of the impeller.

In an embodiment, said process is performed in a double loop reactor. Preferably said double loop reactor, comprise two loop reactors connected in series.

In an embodiment, the anti-fouling agent is introduced into the first loop reactor of the double loop reactor through a sleeve provided around at least part of the shaft of the pump of the first loop reactor.

In an embodiment, the present process is used to produce in two reactors connected to each other in series, a polyethylene resin having a bimodal molecular weight distribution. Subsequently, the polyethylene product is isolated, preferably dried and preferably extruded into pellets.

Adding the antifouling agent through a sleeve provided around at least part of the shaft of the pump has the advantage of reducing or preventing clogging of the equipment.

Figure 2:
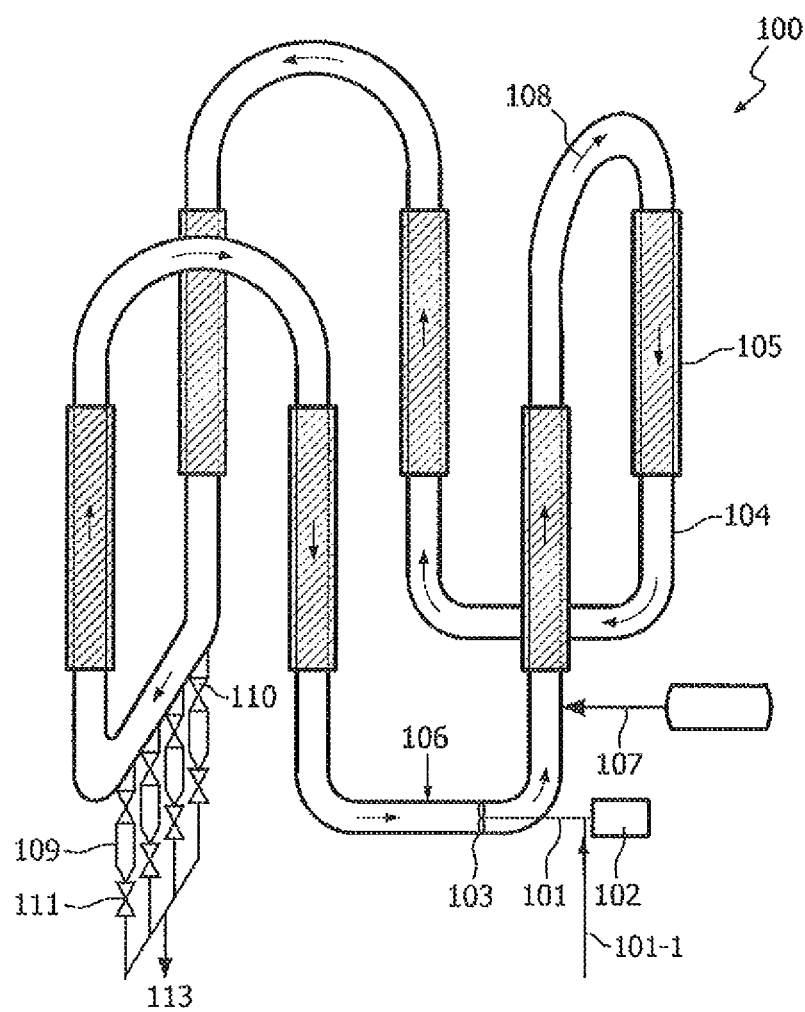
FIG. 2 schematically illustrate a loop reactor that can be used in the process according to an embodiment of the present invention.
Figure 3:
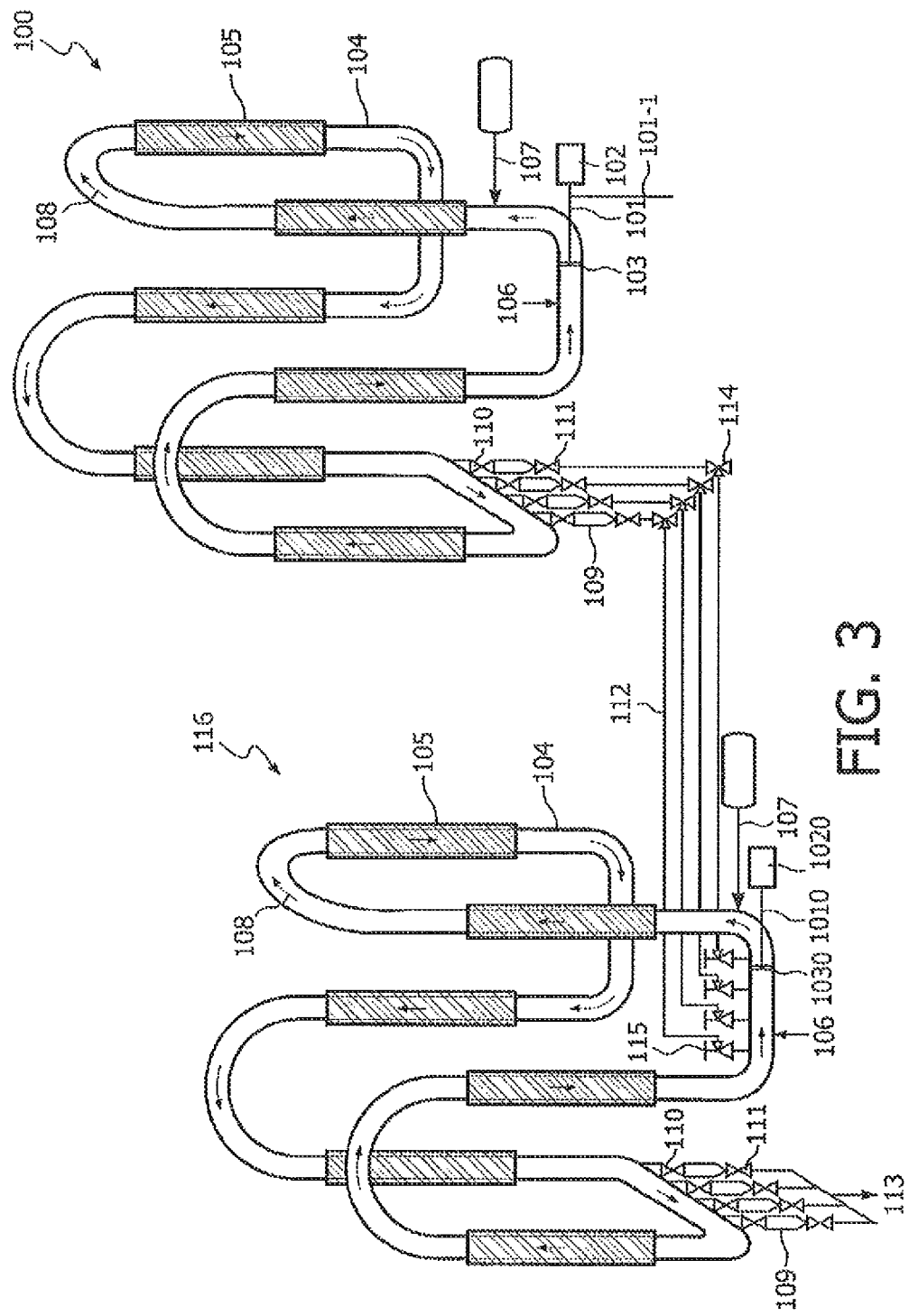
FIG. 3 schematically illustrate a double loop reactor that can be used in the process according to an embodiment of the present invention.

The invention can be understood in detail with reference to the embodiments illustrated in FIGS. 1, 2 and 3.

FIG. 1 represents a schematic cross sectional view of a pump 101 that can be used in processes according to embodiment of the present invention. The pump 101 is located in a bend of a pipe 104 of a loop reactor. The pump 101 produces a flow in the reactor path illustrated by arrow 108. Pump 101 comprises impeller 103, a sleeve 101-5 provided around a shaft 101-3 and a motor 102. Line 101-1 used for the anti-fouling agent is positioned between shaft 101-3 and sleeve 101-5 and has seals 101-2 on one end. The line 101-1 leads to impeller 103 and feeds at least part of the anti-fouling agent against the side of the impeller 103 attached to the shaft of the pump 101 creating a flow illustrated by arrow 101-4. In this illustrated embodiment, the antifouling agent is fed against the impellers 103 of said pump 101.

FIG. 2 represents a single loop reactor 100 according to an embodiment of the invention, consisting of a plurality of interconnected pipes 104. It will be understood that while the loop reactor 100 is illustrated with six vertical pipes, said loop reactor 100 may be equipped with less or more pipes, such as 4 or more pipes, for example between 4 and 6 vertical pipes. The vertical sections of the pipe segments 104 are preferably provided with heat jackets 105. Polymerization heat can be extracted by means of cooling water circulating in these jackets 105 of the reactor.

Reactants such as diluent, monomer, optional co-monomers and reaction additives can be introduced into the reactor 100 by line 107. Catalyst, optionally in conjunction with an activation agent, can be injected in the reactor 100 via the conduct 106. In a preferred embodiment, catalysts are introduced just upstream from the circulation pump, and diluent, monomer, optional co-monomers and reaction additives are introduced just downstream of the circulation pump.

The polymerization slurry is directionally circulated throughout the loop reactor 100 as illustrated by the arrows 108 by one or more pumps, such as axial flow pump 101. The pump may be powered by an electric motor 102. As used herein the term "pump" includes any device from compressing driving, raising the pressure of a fluid, by means for example of a piston or set of rotating impellers 103.

According to an embodiment of the present invention, the antifouling agent is introduced through the sleeve provided around at least part of the shaft of the pump 101. The space between the sleeve and the shaft provide a line 101-1 for feeding the anti-fouling agent to the reactor.

The illustrated reactor 1 is further provided with four settling legs 109 connected to the pipes of the reactor 100. It will be understood that while the loop reactor 100 is illustrated with four settling legs 109, said loop reactor 100 may be equipped with less or more settling legs. As the polymerization progresses polymer slurry accumulates in these settling legs 109. The settling legs 109 are provided with an isolation valve 110. These valves 110 are open under normal conditions and can be closed for example to isolate a settling leg 109 from operation. Further the settling legs are provided with product take off or discharge valves 111. The discharge valves 111 may be any type of valve, which can permit continuous or periodical discharge of polymer slurry, when they are fully open. Polymer slurry settled in the settling legs 109 is removed by means of flash lines 113 to a product recovery zone (not shown).

FIG. 3 represents a double loop reactor with a first reactor 100 connected in series to second reactor 116. The reactors comprise a plurality of interconnected pipes 104. The vertical sections of the interconnected pipe segments 104 are preferably provided with heat jackets 105 to extract heat by means of cooling water. Reactants are introduced into the reactor 100 by line 107. Catalyst, optionally in conjunction with an activation agent, can be injected in the reactor 100 via the conduct 106. The polymerization slurry is directionally circulated throughout the loop reactor 100 as illustrated by the arrows 108 by one or more pumps, such as an axial flow pump 101. Pump 101 is powered by an electric motor 102, and comprises a set of rotating impellers 103. According to an embodiment of the present invention, the antifouling agent is introduced through a sleeve provided around at least part of the shaft of the pump 101. The space between the sleeve and the shaft provide a line 101-1 for feeding the anti-fouling agent to the reactor.

The two loop reactors 100 and 116 are connected in series via the settling legs 109 of the first loop reactor 100. It will be understood that while the loop reactor 100 is illustrated with four settling legs 109, said loop reactor 100 may be equipped with less or more settling legs. The settling legs 109 of first loop reactor 100 are preferably provided with an isolation valve 110. Further, the settling legs can be provided with discharge valves 111. Downstream the valve 111 at the exit of the settling leg 109 of said first reactor 100, a transfer line 112 is provided which allows to transfer polymer slurry settled in the settling leg 109 to the second reactor 116, preferably through a piston valve 115. These transfer lines 112 comprise generally cylindrical, intermediate product transfer lines. Along the transfer line 112, a three-way valve 114 may divert the flow to a product recovery zone if the multiple loop reactor has to be used in a parallel configuration.

Reactants are introduced into the reactor 116 by line 107, and settled polymer slurry from first reactor 100 by line 112 through valve 115. The polymerization slurry is directionally circulated throughout the second loop reactor 116 as illustrated by the arrows 108 by axial flow pump 1010. Pump 1010 is powered by an electric motor 1020, and comprises a set of rotating impellers 1030. Pump 1010 may also be provided with a sleeve around at least part of the shaft of the pump to introduce anti-fouling agent to the second loop reactor 116, preferably is catalyst is also added to the second reactor.

The second reactor 116 is also provided with four settling legs 109. It will be understood that while the loop reactor 116 is illustrated with four settling legs 109, said loop reactor 116 may be equipped with less or more settling legs. The settling legs 109 of second loop reactor 116 are preferably provided with an isolation valve 110 and product take off or discharge valves 111. Polymer slurry settled in the settling legs 109 of the second reactor 116 may be removed by means of one or more product recovery lines 113 for instance to a product recovery zone.

The present invention also encompasses the use of anti-fouling agent to prevent or reduce fouling of a loop reactor comprising a pump with a shaft and an impeller by introducing the anti-fouling agent into the loop reactor against the side of the impeller which is connected to the shaft of said pump. In an embodiment, at least part of the antifouling agent is introduced in the reactor through a sleeve provided around at least part of the shaft of said pump. In an embodiment, all anti-fouling agent is fed through the sleeve into the reactor.

The present invention also encompasses the use of anti-fouling agent to prevent or reduce fouling of a loop reactor comprising a pump with a shaft and an impeller by introducing anti-fouling agent into the loop reactor through a sleeve provided around at least part of the shaft of said pump. Preferably, at least part of the anti-fouling agent is fed against the side of the impeller attached to the shaft of the pump.

Preferably, according to the invention, anti-fouling agent is used to prevent blockage of a loop reactor, more particular to prevent blockage of the pump. Preferably, the anti-fouling agent is used to prevent blockage of a loop reactor with a pump with an impeller by feeding the anti-fouling agent against the side of the impeller attached to the shaft of the pump upon introduction to the loop reactor.

The following non-limiting examples illustrate the invention.

EXAMPLE 1

Ethylene monomer, comonomer, Ziegler-Matta catalyst, hydrogen, TEAI activating agent and about 18 t/h of isobutane diluent were fed to a double loop reactor. An axial pump as illustrated in FIG. 1 was used to circulate the resulting slurry in the first loop reactor. 81 g/h of an 2.5% by weight of Stadis 450 anti-fouling composition dissolved in hexene (density of around 0.7 kg/l) was introduced (leading to around 1157 cc/h feeding of antifouling in hexene) into the first loop reactor. A slurry comprising solid polyethylene particles in diluent was obtained with around 4 ppm antifouling agent as a function of diluent.

The anti-fouling agent was introduced through the sleeve provided around the shaft of the pump and was fed against the side of the impeller attached to the shaft of said pump under flushing with isobutane diluent of 750 kg/h, providing about 108 ppm anti-fouling agent as a function of the diluent in the anti-fouling feed through the pump.

Pump operation was stable during polymerization, process conditions were well-controlled, an optimal polymer end-product was obtained.

EXAMPLE 2

Ethylene monomer, comonomer, a metallocene catalyst, hydrogen, activating agent and about 12.25 t/h diluent were fed in a single loop reactor. An axial pump was used to pump around the resulting slurry. 12.25 g/h of an anti-fouling composition comprising 2.5% of Synperonic PEL121 anti-fouling agent dissolved in hexene (density of around 0.7 kg/l) was introduced into the reactor (thus around 700 cc/h feeding of antifouling in hexene). The anti-fouling agent was introduced through the sleeve provided around the shaft of the pump and was fed against the side of the impeller attached to the shaft of said pump under flushing with isobutane diluent of 750 kg/h in the bend of the reactor path around the impeller of the pump, providing about 16.3 ppm anti-fouling agent as a function of the diluent in the anti-fouling feed through the pump. A slurry comprising solid polyethylene particles in diluent was obtained with around 1 ppm of anti-fouling agent as a function of diluent. Pump operation was stable during polymerization, process conditions were well-controlled, an optimal polymer end-product was obtained.

EXAMPLE 3

Set up 1 (according to an embodiment of the invention): Ethylene monomer, comonomer, Ziegler-Matta catalyst, hydrogen, TEAI activating agent and about 15 t/h of isobutane diluent were fed to a double loop reactor. An axial pump as illustrated in FIG. 1 was used to circulate the resulting slurry in the first loop reactor.

69.3 g/h of a 2.5% by weight of Stadis 450 anti-fouling composition dissolved in hexene was introduced (leading to around 985 cc/h feeding of antifouling in hexene) into the first loop reactor. The anti-fouling agent was introduced through the sleeve provided around the shaft of the pump and was fed against the side of the impeller attached to the shaft of said pump under flushing with isobutane diluent of 750 kg/h, providing about 110 ppm anti-fouling agent as a function of the diluent in the anti-fouling feed through the pump.

Set up 2 (comparative): Ethylene monomer, comonomer, Ziegler-Matta catalyst, hydrogen, TEAI activating agent and about 15 t/h of isobutane diluent were fed to a double loop reactor. An axial pump as illustrated in FIG. 1 was used to circulate the resulting slurry in the first loop reactor.

68 g/h of a 2.5% by weight of Stadis 450 anti-fouling composition dissolved in hexene was introduced in the monomer feed (leading to around 976 cc/h feeding of antifouling in hexene) into the first loop reactor.

Isobutane 750 kg/h was introduced in the sleeve provided around the shaft of the pump and was fed against the side of the impeller attached to the shaft of said pump.

Set up 3 (comparative): Ethylene monomer, comonomer, Ziegler-Natta catalyst, hydrogen, TEAI activating agent and about 15/h of isobutane diluent were fed to a double loop reactor. An axial pump as illustrated in FIG. 1 was used to circulate the resulting slurry in the first loop reactor.

68 g/h of a 2.5% by weight of Stadis 450 anti-fouling composition dissolved in hexene was introduced in the monomer feed (leading to around 976 cc/h feeding of antifouling in hexene) into the first loop reactor.

Isobutane 750 kg/h containing about 6% of monomer was introduced in the sleeve provided around the shaft of the pump and was fed against the side of the impeller attached to the shaft of said pump.

The results of all three set up are shown in Table 1.

TABLE 1

| | Set up 1 | Set up 2 | Set up 3 |
| --- | --- | --- | --- |
| Pump vibration | No vibrations | Small vibrations | Important vibrations increase |
| Pump power | Stable | Stable | |
| Powder accumulation | No accumulation | Accumulation behind impeller | Accumulation along shaft and behind impeller |

During maintenance opening of the pump no polymer accumulation was found behind the impeller and along the shaft in set up 1, when compared with set up 2 and set up 3. The presence of the antifouling agent in the pump in set up 1 prevented an increase of pump vibrations and maintained stable pump power.

The invention claimed is:

1. A process of preparing a polyolefin in a loop reactor in the presence of anti-fouling agent, said loop reactor comprising interconnected pipes, defining a reactor path, and an axial pump comprising a motor, a shaft and an impeller, characterized in that at least part of the anti-fouling agent is introduced into said loop reactor through a sleeve provided around at least part of the shaft of said axial pump.

2. The process according to claim 1, wherein at least part of the anti-fouling agent is fed against a side of the impeller which is connected to the shaft of said axial pump.

3. The process according to claim 1, wherein all anti-fouling agent is fed through the sleeve into the loop reactor.

4. The process according to claim 1, wherein the anti-fouling agent is dissolved at a concentration of 0.1-10% by weight in a solvent.

5. The process according to claim 1, wherein the anti-fouling agent is fed under flushing with diluent.

6. The process according to claim 5, wherein the diluent comprises less than 15% by weight of monomer.

7. The process according to claim 1, wherein said polyolefin is produced in slurry conditions.

8. The process according to claim 1, wherein said loop reactor is a double loop reactor.

9. The process according to claim 8, wherein the anti-fouling agent is introduced into a first loop reactor of the double loop reactor through the sleeve provided around at least part of the shaft of the axial pump of the first loop reactor.

10. The process according to claim 1, wherein the polyolefin is polyethylene.

11. A process for using anti-fouling agent to prevent or reduce fouling of a loop reactor during a polymerization process comprising a pump with a shaft and an impeller comprising introducing the anti-fouling agent into the loop reactor against a side of the impeller which is connected to the shaft of said pump.

12. The process according to claim 11, wherein at least part of the anti-fouling agent is introduced in the loop reactor through a sleeve provided around at least part of the shaft of said pump.

13. The process according to claim 12, wherein all anti-fouling agent is fed through the sleeve into the loop reactor.

14. The process according to claim 11, wherein the anti-fouling agent is dissolved at a concentration of 0.1-10% by weight in a solvent.

15. The process according to claim 1, wherein the anti-fouling agent comprises cationic agents, anionic agents, non-ionic agents, organometallic agents, polymeric agents or mixtures thereof.

16. The process according to claim 5, wherein the diluent comprises less than 10% by weight of monomer.

17. The process according to claim 5, wherein the diluent comprises less than 5% by weight of monomer.

18. The process according to claim 5, wherein the diluent comprises less than 1% by weight of monomer.

* * * * *